(12) United States Patent
Nakamura

(10) Patent No.: US 11,829,053 B2
(45) Date of Patent: Nov. 28, 2023

(54) OPTICAL UNIT, OPTICAL APPARATUS, IMAGING APPARATUS, AND IMAGING SYSTEM

(71) Applicant: CANON KABUSHIKI KAISHA, Tokyo (JP)

(72) Inventor: Tsubasa Nakamura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 16/984,722

(22) Filed: Aug. 4, 2020

(65) Prior Publication Data
US 2021/0041769 A1 Feb. 11, 2021

(30) Foreign Application Priority Data

Aug. 9, 2019 (JP) .................................. 2019-147444
May 25, 2020 (JP) .................................. 2020-090593

(51) Int. Cl.
| | | |
|---|---|---|
| *G03B 17/14* | (2021.01) | |
| *G02B 7/00* | (2021.01) | |
| *G02B 7/02* | (2021.01) | |
| *H04N 23/55* | (2023.01) | |
| *H04N 23/80* | (2023.01) | |

(52) U.S. Cl.
CPC ............ *G03B 17/14* (2013.01); *G02B 7/006* (2013.01); *G02B 7/021* (2013.01); *H04N 23/55* (2023.01); *H04N 23/80* (2023.01)

(58) Field of Classification Search
CPC ........ G03B 17/14; G02B 7/006; G02B 7/021; H04N 5/2254; H04N 5/23229; H04N 5/23209; H04N 23/55; H04N 23/80; H04N 23/663
See application file for complete search history.

(56) References Cited

U.S. PATENT DOCUMENTS

| | | | | |
|---|---|---|---|---|
| 8,164,673 B2* | 4/2012 | Horie | ................ | G02B 5/28 |
| | | | | 348/335 |
| 10,567,678 B2* | 2/2020 | Nelson | .................. | H04N 5/332 |
| 10,574,911 B2* | 2/2020 | Dvir | ..................... | H04N 5/238 |
| 2003/0184853 A1* | 10/2003 | Sasaki | ................. | G02B 26/007 |
| | | | | 359/363 |
| 2009/0161003 A1* | 6/2009 | Takahashi | ............ | G02B 26/007 |
| | | | | 348/360 |

(Continued)

FOREIGN PATENT DOCUMENTS

| | | | | |
|---|---|---|---|---|
| CN | 112166375 A | * | 1/2021 | |
| JP | 2831995 B2 | | 12/1998 | |

(Continued)

*Primary Examiner* — Chiawei Chen
(74) *Attorney, Agent, or Firm* — Canon U.S.A., Inc. I.P. Division

(57) ABSTRACT

An optical unit detachably mountable to a lens barrel portion disposed closer to an object than an image sensor included in an imaging apparatus includes a plurality of lens units each configured to form an image of the object, a plurality of filters disposed on optical axes of the plurality of lens units, and a common holding member configured to hold the plurality of lens units and the plurality of filters. The plurality of filters includes a first filter and a second filter having light transmission characteristics different from each other. The holding member includes a coupling portion capable of being coupled with the lens barrel portion.

20 Claims, 7 Drawing Sheets

(56) References Cited

U.S. PATENT DOCUMENTS

| | | | | |
|---|---|---|---|---|
| 2009/0244355 | A1* | 10/2009 | Horie | H04N 5/232 |
| | | | | 359/578 |
| 2011/0316108 | A1* | 12/2011 | Nihei | H01L 27/14683 |
| | | | | 438/69 |
| 2012/0249744 | A1* | 10/2012 | Pesach | H01L 27/14685 |
| | | | | 348/E9.005 |
| 2012/0250153 | A1* | 10/2012 | Kawasaki | H04N 13/239 |
| | | | | 359/477 |
| 2015/0234150 | A1* | 8/2015 | Katsunuma | G01J 3/0208 |
| | | | | 348/360 |
| 2016/0223781 | A1* | 8/2016 | Du | G02B 7/021 |
| 2016/0223783 | A1* | 8/2016 | Du | H04N 5/2254 |
| 2017/0089761 | A1* | 3/2017 | McQuilkin | A61B 5/0075 |
| 2018/0024419 | A1* | 1/2018 | Sheridan | G03B 17/12 |
| | | | | 348/47 |
| 2018/0167557 | A1* | 6/2018 | Feinberg | H04N 5/225251 |
| 2018/0176488 | A1* | 6/2018 | Dvir | G02B 23/18 |
| 2020/0092482 | A1* | 3/2020 | Tsuruyama | H04N 23/10 |

FOREIGN PATENT DOCUMENTS

| | | |
|---|---|---|
| JP | 2018-526664 A | 9/2018 |
| WO | 13/179620 A1 | 12/2013 |

* cited by examiner

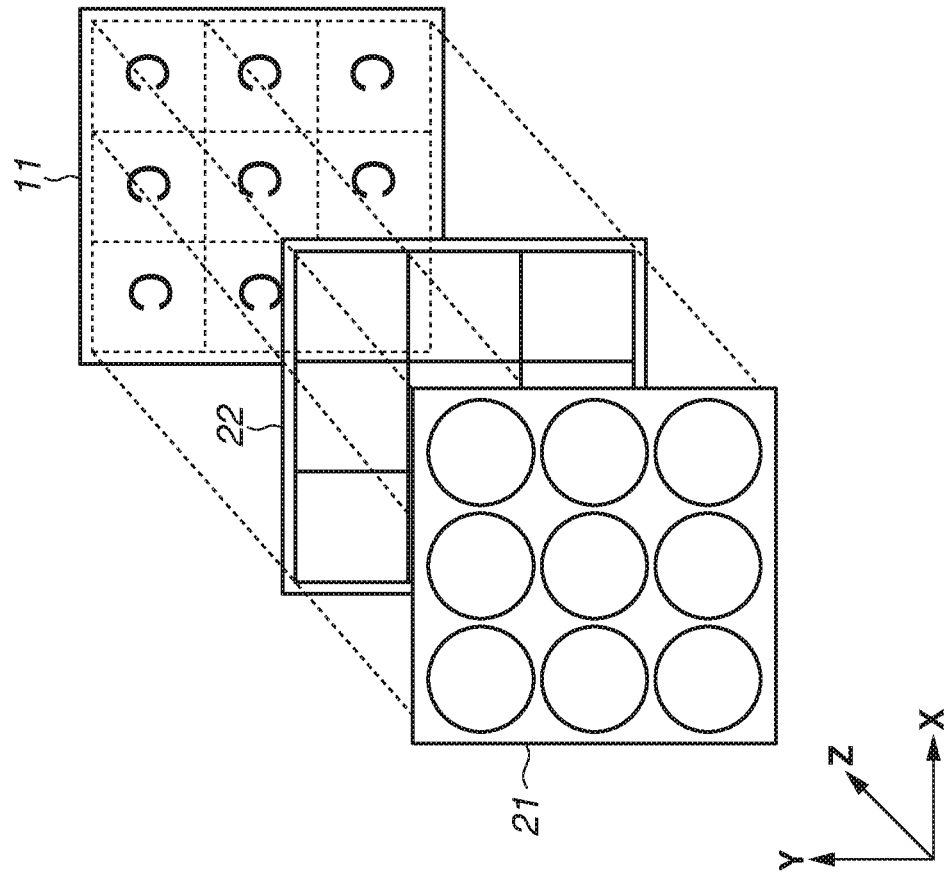
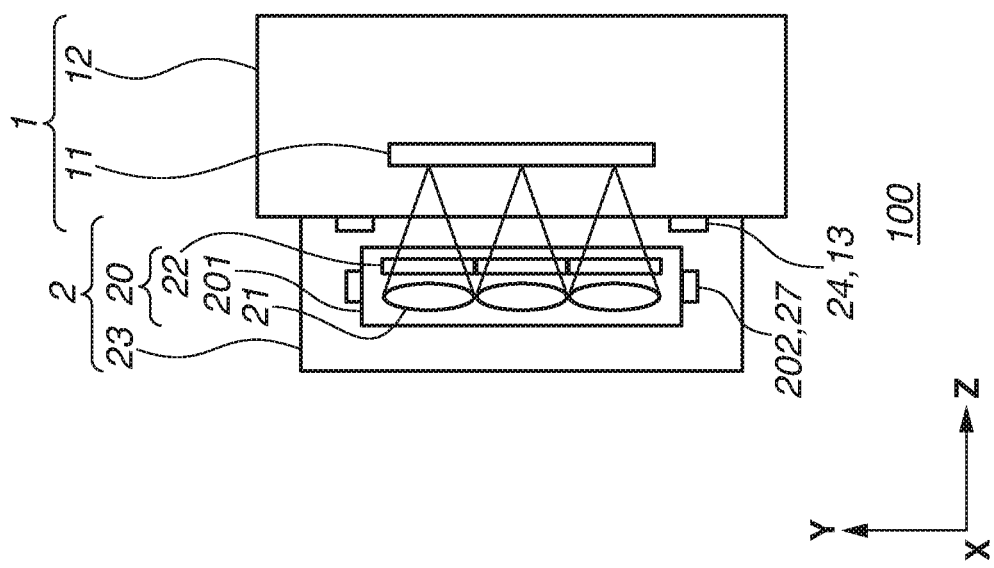
FIG.1

OPTICAL UNIT, OPTICAL APPARATUS, IMAGING APPARATUS, AND IMAGING SYSTEM

BACKGROUND

Field of the Disclosure

The present disclosure relates to an optical apparatus including a plurality of lens units configured to each form an image of an object, and is effectively applicable to imaging systems such as a digital still camera and a video camera.

Description of the Related Art

An apparatus is known that forms a plurality of images of the same object (subject) by a plurality of lenses, as an optical apparatus used with an imaging apparatus. Such an optical apparatus is able to acquire a plurality of pieces of image information different from each other simultaneously by imaging the object once, by being provided with a plurality of filters having light transmission characteristics different from each other on the optical axes of the plurality of lenses.

Japanese Unexamined Patent Application Publication (Translation of PCT Application) No. 2018-526664 discusses an optical apparatus detachably attachable to an imaging apparatus, and including a plurality of lenses and a plurality of filters.

However, the configuration discussed in Japanese Unexamined Patent Application Publication (Translation of PCT Application) No. 2018-526664 necessitates the replacement of the entire optical apparatus to change the image information to acquire.

SUMMARY

The present disclosure is directed to providing an optical unit, an optical apparatus, and an imaging apparatus that make it possible to easily change the plurality of pieces of image information to acquire simultaneously.

According to an aspect of the present invention, an optical unit detachably mountable to a lens barrel portion disposed closer to an object than an image sensor included in an imaging apparatus includes a plurality of lens units each configured to form an image of the object, a plurality of filters disposed on optical axes of the plurality of lens units, and a common holding member configured to hold the plurality of lens units and the plurality of filters. The plurality of filters includes a first filter and a second filter having light transmission characteristics different from each other. The holding member includes a coupling portion capable of being coupled with the lens barrel portion.

Further features of the present invention will become apparent from the following description of exemplary embodiments with reference to the attached drawings.

BRIEF DESCRIPTION OF THE DRAWINGS

FIG. 1 illustrates an outline of main portions of an imaging system according to a first exemplary embodiment.

DESCRIPTION OF THE EMBODIMENTS

Figure 2:
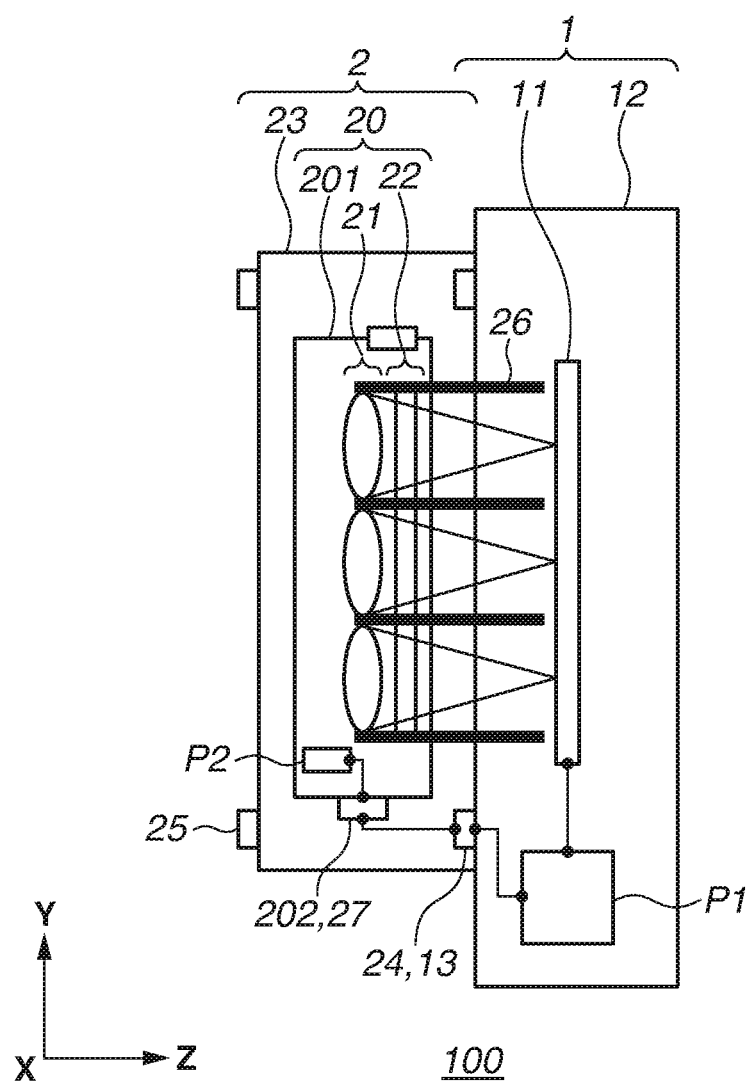
FIG. 2 illustrates an outline of main portions of an imaging system according to an exemplary modification of the first exemplary embodiment.

In the following description, representative exemplary embodiments of the present invention will be described with reference to the drawings. Each of the drawings may be drawn at a different scale from actual dimensions for the sake of convenience. Further, the same members will be identified by the same reference numerals in each of the drawings, and redundant descriptions will be omitted.

An imaging system 100 includes an imaging apparatus (a camera unit) 1 and an optical apparatus (a lens barrel unit) 2 disposed closer to the object side than the imaging apparatus 1 is. The imaging apparatus 1 includes an image sensor (a light reception element) 11 including an imaging plane (a light reception plane) positioned on an image plane of the optical apparatus 2, and a holding member (a casing) 12 holding the image sensor 11.

The optical apparatus 2 includes an optical unit (a first optical unit or an array unit) 20 and a holding member (a lens barrel portion) 23 holding the optical unit 20. The optical unit 20 includes a lens array 21 formed by a plurality of lens units configured to each form an image of an object, a filter array 22 formed by a plurality of filters disposed on the respective optical axes of the lens units, and a holding member 201 holding the lens array 21 and the filter array 22.

A photoelectric conversion element, such as a charge coupled device (CCD) sensor or a complementary metal-oxide semiconductor (CMOS) sensor, can be employed as the image sensor 11. Further, the image sensor 11 may be configured to be able to photoelectrically convert not only visible light but also infrared light (near-infrared light and far-infrared light) and the like. For example, an image sensor using a material such as silicon (Si), indium gallium arsenide (InGaAs), or indium arsenide antimonide (InAsSb) may be employed according to the wavelength band to be used. Further, desirably, the number of pixels of the image sensor 11 is determined based on resolving power required in the imaging system 100.

Each of the plurality of lens units according to the present exemplary embodiment includes one or more lenses, and each of the lens units forms an image on the imaging plane of the image sensor 11. In other words, a plurality of images (an image array) of the object is formed on the image plane of the lens array 21 by the plurality of lens units. That is, the image of the same object can be copied according to the lens array 21. The plurality of lens units may be integrally formed to facilitate the manufacturing and the layout thereof, or may be formed as different members to allow the positions thereof to be individually adjusted (a focus adjustment and the like).

The plurality of filters (optical filters) according to the present exemplary embodiment includes two or more filters having light transmission characteristics different from each other. The light transmission characteristic here refers to an optical characteristic that changes the state of incident light, such as the wavelength band of light permitted to be transmitted therethrough (a transmission wavelength range), the direction and the type of polarized light permitted to be transmitted therethrough (a polarization state), and the intensity of transmitted light with respect to the intensity of incident light (a transmittance). Forming the filter array 22 by the plurality of filters having light transmission characteristics different from each other allows the imaging system 100 to acquire a plurality of pieces of image information different from each other with respect to the same object simultaneously.

The filter array 22 may be configured in various manners as long as it includes at least two filters having light transmission characteristics different from each other (a first filter and a second filter). In other words, the filter array 22 may include two or more filters having light transmission characteristics identical to each other. For example, in a case where the imaging system 100 is used as a distance measurement apparatus (a stereo camera), with the aim of acquiring distance information of the object using two pieces of image information indicating parallax images different from each other, desirably, two filters corresponding to these pieces of image information have substantially identical light transmission characteristics. However, desirably, the plurality of filters has light transmission characteristics all different from each other to acquire a plurality of pieces of image information different from each other as many as possible by imaging the object once.

For example, a plurality of pieces of image information corresponding to a plurality of wavelength bands can be acquired simultaneously by using a plurality of filters with the transmission wavelength ranges thereof having central wavelengths different from each other (bandpass filters). In this case, desirably, the imaging system 100 is configured as a multispectral camera capable of acquiring image information corresponding to four or more types of wavelength bands, which is more than the wavelength band of a commonly-used camera (Red-Green-Blue (RGB)). Further, more desirably, the imaging system 100 is configured as a hyperspectral camera capable of acquiring image information corresponding to 100 or more types of wavelength bands. A wavelength conversion filter that converts the wavelength of the incident light and outputs it may be used in place of the bandpass filter.

Alternatively, a plurality of pieces of image information corresponding to a plurality of polarization states can be acquired simultaneously by using a plurality of different types of polarization filters from each other. One possible example of this configuration is using three linear polarization filters that permit the transmission of linearly polarized light in respective directions parallel to an X direction (a horizontal direction), a Y direction (a vertical direction), and a direction at 45 degrees with respect to the X direction and the Y direction, and a circular polarization filter that permits the transmission of circularly polarized light. Polarization information, such as the polarization characteristic of the object (the Stokes parameters) and a two-dimensional distribution of the polarization state of the object, can be acquired by using the plurality of types of polarization filters that changes the polarization state of the incident light in this manner.

The imaging system 100 may be configured to be able to acquire different types of information, such as wavelength information, polarization information, luminance information, and parallax information, simultaneously by forming the filter array 22 by a plurality of filters having different types of light transmission characteristics. In this case, the imaging system 100 is not limited to the configuration in which the plurality of different types of filters from each other is disposed on the optical axes of different lens units from each other, and may be configured in such a manner that the plurality of different types of filters from each other is disposed on the same optical axis. In the latter case, the acquired image information can be divided into the different types of image information by filtering the acquired image information by a not-illustrated image processing unit.

Further, the image sensor 11, which is made from a silicon material generally used for the visible wavelength band, has a sensitivity characteristic that is more sensitive to the central wavelength band (around 550 nm) than to the short wavelength band (450 nm or shorter) and the long wavelength band (750 nm or longer). Therefore, in a case where a plurality of bandpass filters corresponding to these respective wavelength bands is used, desirably, a neutral density filter is disposed on the optical axis where a bandpass filter corresponding to the central wavelength band is disposed. In this case, using the polarization filter as the neutral density filter allows the imaging system 100 to not only correct the balance among luminances of the respective pieces of image information but also acquire the wavelength information and the polarization information simultaneously.

Desirably, each of the individual lens units and each of the individual filters are disposed so as to make a pair with each other to disperse the light emitted from the object to acquire the desired plurality of pieces image information. In other words, desirably, all light beams transmitted through one lens unit are transmitted through only one type of filter disposed on the optical axis thereof. The one type of filter here includes a filter formed by a plurality of filter elements disposed on the same optical axis. However, if being configured in such a manner that only the filer array 22 is replaceable or being configured in such a manner that only the lens array 21 is replaceable, the imaging system 100 may undesirably impair the correspondence relationship between each of the lens units and each of the filters, failing to acquire excellent image information. For example, when the lens array 21 is replaced to cause changes in the size (the effective diameter) and the layout of each of the lens units, such a replacement necessitates changes in the size and the layout of each of the filters according thereto.

Further, a chromatic aberration of each of the lens units on the image plane changes depending on the light transmission characteristic of the bandpass filter corresponding thereto, and an in-focus position (a focus position) and a distortion of each of the lens units also unintentionally change according thereto. In a case where a filter other than the bandpass filter is used, the optical performance may also unintentionally change according to, for example, the anisotropy of each of the filters. Therefore, when the filter array 22 is replaced to cause a change in the light transmission characteristic of each of the filters, such a replacement necessitates changes in the position and the configuration (the design) of each of the lens units according thereto. However, even if the imaging system 100 is ever configured to allow the lens array 21 and the filter array 22 to be replaced individually and allow each appropriate combination of them to be selected, an error in the respective relative positions might prohibit the imaging system 100 from acquiring an excellent optical performance.

Therefore, in the present exemplary embodiment, a misalignment in the respective relative positions is prevented by integrally holding the lens array 21 and the filter array 22 using the holding member 201. Further, the holding member 201 includes a coupling portion (a detachable attachment portion) 202 for being coupled with a coupling portion (a first coupling portion) 27 provided to the holding member 23. This configuration allows the optical unit 20 to be detachably attached to the optical apparatus 2 as an accessary via the coupling portion 202. In other words, the present configuration allows the lens array 21 and the filter array 22 to be replaced simultaneously while allowing them to be integrally held to the imaging system 100.

According to this configuration, the imaging system 100 can change the type and the resolution of the image information to acquire while preventing the misalignment between the relative positions of the lens array 21 and the filter array 22. More specifically, when the filter array 22 is replaced with another filter array having a different light transmission characteristic, the lens array 21 can also be replaced with another lens array corresponding to (optimized for) the filter array simultaneously. As a result, the imaging system 100 can prevent the aberration of each of the lenses and the change in the focus thereof. Further, the resolution of the imaging system 100 can be changed by replacing the lens array 21 with another lens array including a different number of lens units. In this case, the filter array 22 can also be replaced with another filter array corresponding to the lens array simultaneously.

In this manner, the imaging system 100 according to the present exemplary embodiment allows the optical unit 20 to be replaced according to the image information desired to acquire and the conditions of the subject. Especially, since the lens array 21 is replaceable, the type (the band number and the like) of the image information and the resolution can be increased/reduced based on an increase/reduction in the number of lens units. Then, since the lens array 21 and the filter array 22 can be replaced integrally, the change in the optical performance can be prevented at the time of the replacement. This advantage allows the imaging system 100 to acquire a plurality of pieces of excellent image information using the common imaging apparatus 1 simultaneously independently of the configuration of the optical unit 20.

The configuration in which the entire optical apparatus is replaced, like the imaging system discussed in Japanese Unexamined Patent Application Publication (Translation of PCT Application) No. 2018-526664, necessitates the replacement of even a member that would not have to be replaced (that should have been usable in common) according to the change in the image information, such as the lens barrel portion. In this case, the change in the image information ends up in requiring many members. This issue becomes further noticeable when the optical apparatus 2 includes an optical system disposed on the object side or the image side of the optical unit 20, as will be described below. On the other hand, the imaging system 100 according to the present exemplary embodiment allows the image information to be easily changed by replacing only the optical unit 20, which is the minimum configuration required to be replaced to change the image information, instead of replacing the entire optical apparatus 2.

The configurations (the shapes) of the coupling portions 202 and 27 are not especially limited, but, desirably, each of them includes an electric contact for electrically connecting to each other. This configuration allows them to, for example, communicate information to each other and receive/supply electric power from/to each other. Further, desirably, the optical unit 20 includes a storage unit that stores information regarding the lens array 21 and the filter array 22. This configuration allows the optical unit 20 to transmit the information regarding the lens array 21 and the filter array 22 to the optical apparatus 2 and the imaging apparatus 1, thereby allowing them to perform various kinds of processing that will be described below.

As illustrated in FIG. 1, desirably, the coupling portion 202 is disposed outside the lens array 21 and the filter array 22 in a direction perpendicular to the optical axis. This layout facilitates the insertion and the extraction of the optical unit 20 into and from the optical path, and also contributes to reducing the length of the optical apparatus 2 in the optical-axis direction. For example, the optical apparatus 2 can be configured in such a manner that an opening is provided on the outer peripheral surface of the holding member 23 and the optical unit 20 is inserted into the holding member 23 from the direction perpendicular to the optical axis via this opening. The coupling portion 202 does not have to be provided throughout the entire circumference outside the lens array 21 and the filter array 22 when being viewed from the Z direction, and only has to be provided on at least a part thereof. Further, the coupling portion 202 may be disposed on the object side or the image side with respect to the lens array 21 and the filter array 22 as necessary.

The imaging system 100 according to the present exemplary embodiment is configured in such a manner that the entire optical apparatus 2 is detachably attachable to the imaging apparatus 1. More specifically, the imaging system 100 is configured in such a manner that the holding member 23 includes a first mount portion (a coupling portion) 24 for being coupled with the imaging apparatus 1, and the optical apparatus 2 is detachably attachable to the imaging apparatus 1 via the first mount portion 24. This configuration allows the optical apparatus 2 to be replaced independently of the optical unit 20, for example, when the optical system disposed on the object side or the image side of the optical unit 20 is desired to be changed. Further, according to this configuration, the optical apparatus 2 can be equipped with a function as an adapter apparatus (an adapter unit) that couples the imaging apparatus 1 and an accessory apparatus that will be described below. The shape of the first mount portion 24 may be any shape corresponding to a mount portion 13 provided on the imaging apparatus 1. For example, a coupling portion (a bayonet claw, a protrusion portion or a recessed portion, a magnet, or the like) provided on the circumference of a circle surrounding the imaging plane when being viewed from the optical-axis direction (the Z direction) can be employed as the first mount portion 24. FIG. 1 illustrates the first mount portion 24 as a recessed portion and illustrates the mount portion 13 of the imaging apparatus 1 as a protrusion portion, but the respective shapes of the mount portions 24 and 13 are not limited thereto. Further, desirably, an electric contact (a terminal) for electrically connecting to the imaging apparatus 1 is provided to the first amount portion 24. This provision allows the optical apparatus 2 to communicate with the imaging apparatus 1 and receive electric power from the imaging apparatus 1 via the electric contact.

As illustrated in FIG. 2, the holding member 23 may include not only the first mount portion 24 provided on the image side but also a second mount portion (a coupling portion) 25 provided on the object side. This configuration allows an accessory apparatus such as a lens apparatus and an adapter apparatus that will be described below, to be detachably attached to the optical apparatus 2. FIG. 2 illustrates the second mount portion 25 as a protrusion portion, but the shape of the second mount portion 25 is not limited thereto and may be any shape set according to the shape of the mount portion on the accessory apparatus intended to be mounted thereby. Desirably, the second mount portion 25 is also provided with an electric contact for communicating with the accessory apparatus and receiving/supplying electric power from/to the accessory apparatus.

However, the imaging system 100 is not limited to the above-described configuration, and, for example, the imaging apparatus 1 and the optical apparatus 2 may be integrally configured (configured to be unable to be detachably attached) and may be collectively referred to as the imaging apparatus. In this case, the holding member 12 (the camera casing) and the holding member 23 (the lens barrel portion) can be integrally configured, which eliminates the necessity of providing the mount portions 13 and 24 to them, respectively. Even in this case, the above-described advantageous effects can be acquired by configuring the optical unit 20 to be detachably attachable to the lens barrel portion. A coupling portion may be provided to the optical system disposed on the object side or the image side of the optical unit 20 to make this optical system detachably attachable to the holding member 23 as necessary.

The optical unit 20 according to the present exemplary embodiment includes nine lens units and nine filters disposed on the respective optical axes of the lens units as illustrated in FIG. 1. This means that the optical unit 20 includes nine image forming units, assuming that the lens unit and the filter disposed on the same optical axis are collectively treated as one image forming unit. The plurality of image forming units will also be collectively referred to as an image forming unit array. The number of image forming units is not limited thereto, and may be a different number as long as the optical unit 20 includes at least two image forming units. However, to acquire the image information corresponding to even more light transmission characteristics by imaging the object once, desirably, four or more image forming units are provided, and, more desirably, nine or more image forming units are provided like the present exemplary embodiment.

The light from the object reaches the imaging plane of the image sensor 11 via the lens array 21 and the filter array 22 in order. At this time, nine images (copied images) are formed according to the respective image forming units on the imaging plane. FIG. 1 illustrates images formed on the imaging plane when the object as the subject is a character "C" as a hypothetical example. The image forming optical system included in the imaging system 100 according to the present exemplary embodiment is only the lens array 21 including the plurality of lens units each formed by a single lens, and therefore each of the images is formed as an inverted image.

Desirably, a common (single) image sensor among the individual lens units is provided, like the image sensor 11 according to the present exemplary embodiment, to miniaturize the imaging apparatus 1. Further, even when the number of lens units and the layout thereof are changed due to the replacement of the optical unit 20, excellent image information can be still acquired by using the image sensor common among the individual lens units. In this case, desirably, a plurality of pixels (photodiodes) forming the image sensor 11 is arranged evenly without any gap as much as possible to improve the use efficiency of the image sensor 11.

Nevertheless, an image sensor may be provided individually for each of the lens units as necessary. In this case, desirably, the respective image sensors are arranged evenly without any gap as much as possible to miniaturize the entire apparatus. Further, desirably, the individual lens units are arranged in conformity with the shape of the imaging plane of the image sensor 11 to miniaturize the optical unit 20. More specifically, desirably, the individual lens units are squarely laid out in X-Y cross section as illustrated in FIG. 1. In a case where the imaging plane of the image sensor 11 is not square, the aspect ratio or the like of the layout of the individual lens units may be changed.

FIG. 1 illustrates a boundary between the plurality of images (image forming regions) on the imaging plane of the image sensor 11 with a broken line. However, this broken line indicates segmentation corresponding to each of the image forming units on the imaging plane for the sake of convenience, and does not indicate a structure. Desirably, a stop member (a light-shielding member) corresponding to each of the image forming units is provided when the boundary of each of the images should be clarified actually as indicated by the broken line. For example, desirably, a light-shielding member 26 is provided on the boundary of each of the image forming units (between the optical axes) as illustrated in FIG. 2. Due to this configuration, unnecessary light (stray light) can be prevented from entering the image forming region corresponding to some image forming unit (a first image forming unit) from another image forming unit (a second image forming unit) adjacent thereto.

Since the optical unit 20 according to the present exemplary embodiment is configured to be detachably attachable to the optical apparatus 2 as described above, desirably, the light-shielding member 26 is held by the holding member 201 in the optical unit 20. Due to this configuration, the light-shielding member 26 can be replaced with another member corresponding to the lens array 21 and the filter array 22 simultaneously when the lens array 21 and the filter array 22 are replaced. Further, desirably, the light-shielding member 26 is configured to extend to near the image sensor 11 inside the imaging apparatus 1 as illustrated in FIG. 2 to sufficiently block the unnecessary light.

In FIG. 2, the light-shielding member 26 is disposed so as to correspond to the rectangular image forming region indicated by the broken line in FIG. 1. However, the arrangement of the light-shielding member 26 is not limited thereto and the light-shielding member 26 may be arranged in a different manner as long as it corresponds to the layout of each of the image forming units and the required shape of each of the image forming regions. For example, the shape of each of the image forming regions may be an arbitrary shape such as a circle instead of the rectangle, or the size of each of the image forming regions may be changed. However, to improve the use efficiency of the imaging plane, desirably, the imaging plane is configured to be equally divided by defining each of the image forming regions as an equally-sized rectangle as illustrated in FIG. 1. Alternatively, in a case where each of the image forming units is arranged in a honeycomb layout, the light-shielding member 26 can corresponds to it by being structured in a honeycomb manner according thereto.

The order of the layout of the lens array 21 and the filter array 22 in the optical-axis direction is not limited to the example illustrated in FIG. 1. For example, in a case where an interference-type bandpass filter is used, desirably, the filter array 22 is disposed closer to the object side than the lens array 21 is so as to reduce the incident angle of the light on each of the filters in consideration of the angular characteristic (the angular dependency) of such a bandpass filter. However, in a case where each of the lens units in the lens array 21 is sufficiently telecentric, the incident angle of the light with respect to each of the filters can be reduced even with the filter array 22 disposed closer to the image side (the +Z side) than the lens array 21 is.

Further, in the case where the filter array 22 is disposed closer to the object side than the lens array 21 is, this layout may undesirably cause a loss of an off-axis light beam incident on the lens array 21 (vignetting). Therefore, in a case where a filter is used that has low angular dependency, such as an absorption-type bandpass filter or the light use efficiency is prioritized over the angular dependency of the filter, desirably, the filter array 22 is disposed closer to the image side than the lens array 21 is.

In the imaging system 100 according to the present exemplary embodiment, a mounting error may occur depending on the precision of the manufacturing of the respective coupling portions when the optical unit 20 is mounted on the optical apparatus 2 or the optical apparatus 2 is mounted on the imaging apparatus 1. In this case, an error may occur in the positional relationship between the lens array 21 and the filter array 22, and the image sensor 11, and the lens array 21 may accidentally be out of focus (defocused) with respect to the imaging plane of the image sensor 11. Therefore, desirably, the imaging system 100 is provided with a movement mechanism for moving the lens array 21 in the optical-axis direction, and configured to be able to adjust the focus of the lens array 21.

Alternatively, the imaging system 100 may be provided with a movement mechanism for moving the image sensor 11 in the optical-axis direction instead of the lens array 21, and configured to be able to carry out the focus adjustment with the aid of the movement of the image sensor 11 (sensor focus). The mounting error of the optical unit 20 or the optical apparatus 2 may lead to a tilt of the image plane of the lens array 21 with respect to the imaging plane, thereby undesirably resulting in field curvature or the lens units defocused in different manners or by different amounts for each of the lens units. Therefore, desirably, the imaging system 100 is configured to be able to change the tilt of the image sensor 11 (the tilt angle) with respect to the optical axis. Further, the imaging system 100 may be configured to be able to correct an image blur (a camera shake) by moving the image sensor 11 in a direction containing a component in the direction perpendicular to the optical axis.

Further, the individual lens units may be defocused in different directions or by different amounts from each other, depending on the light transmission characteristics of the filters forming the filter array 22. Therefore, more desirably, the imaging system 100 is configured to allow the respective positions of the plurality of lens units forming the lens array 21 to be individually adjusted. In this case, employing a lens elongated in the optical-axis direction, such as a rod lens, as each of the lens units allows the imaging system 100 to stably hold each of the lens units, thereby allowing the imaging system 100 to prevent the lens unit from being tilted and/or decentered from the optical axis when each of the lens units is adjusted.

In a case where each of the lens units is formed by a plurality of lenses disposed on the same optical axis for the purpose of, for example, a correction of a chromatic aberration, a lens barrel (a small-diameter lens barrel) holding each of the lens units also has a shape elongated in the optical-axis direction, and therefore similar advantageous effects can be acquired. In this case, stray light can be prevented from reaching the imaging plane by applying a light-shielding coating material to an end (an edge) of the inside of each of the lens barrels in the direction perpendicular to the optical axis or providing a light-shielding member between adjacent lens barrels. For example, the light-shielding member 26 illustrated in FIG. 2 may be used as the lens barrel.

Next, a processing system in the imaging system 100 will be described. As described above, the characteristic of the image information output from the image sensor 11 varies depending on the configuration of the optical unit 20 mounted on the imaging apparatus 1. Therefore, it is desirable to realize a system for appropriately processing the image information regardless of what kind of optical unit 20 is mounted on the imaging apparatus 1. More specifically, desirably, the optical unit 20 includes a storage unit that stores information to be transmitted to the imaging apparatus 1, a communication unit for transmitting/receiving it, and a recognition unit for recognizing the connection to the imaging apparatus 1.

FIG. 2 illustrates the imaging system 100 when the imaging apparatus 1 includes a processing unit P1 and the optical unit 20 includes a storage unit P2. The processing unit P1 has at least functions as the communication unit and the recognition unit. The storage unit P2 stores unique information of the optical unit 20 therein. The imaging apparatus 1 and another external apparatus can acquire the unique information by accessing the storage unit P2. The unique information of the optical apparatus 2 contains information regarding the lens array 21 and the filter array 22. The information regarding the lens array 21 and the filter array 22 refers to, for example, an identifier (ID) such as an identification number of each of the lens array 21 and the filter array 22, an identifier regarding the combination of the lens array 21 and the filter array 22, and the like.

The processing unit P1 and the storage unit P2 are electrically connected to each other via the respective electric contacts provided to the coupling portions 202 and 27 and the mount portions 24 and 13, when the optical unit 20 is mounted on the imaging apparatus 1. The processing unit P1 can recognize that the optical unit 20 is mounted on the imaging apparatus 1 (the attachment/detachment state) and recognize the type and the individual of the optical unit 20 by reading out (receiving) the unique information of the optical unit 20 stored in the storage unit P2. The method for the communication between the processing unit P1 and the storage unit P2 is not limited to this example. For example, the storage unit P2 may be equipped with the function as the communication unit and configured to be able to initiatively transmit information therefrom, thereby allowing the processing unit P1 and the storage unit P2 to transmit/receive information (a signal) to/from each other. In a case where no electric contact is provided to each of the mount portions, for example, wireless communication such as optical communication may be carried out.

In the imaging system 100 according to the present exemplary embodiment, the imaging apparatus 1 has an electric power source, and the optical unit 20 has no electric power source. Therefore, as described above, desirably, the imaging system 100 is configured in such a manner that the storage unit P2 is not equipped with the function as the communication unit and the mounting of the optical unit 20 is recognized by the processing unit P1 in the imaging apparatus 1. Nevertheless, in the case where the processing unit P1 and the storage unit P2 carry out the wireless communication therebetween, the imaging system 100 may be configured in such a manner that an electric power source is provided to each of the imaging apparatus 1 and the optical unit 20, and each of them carries out the recognition individually.

The imaging system 100 may be configured in such a manner that the optical apparatus 2 includes a processing unit as necessary. Examples employable as the processing unit in this case include a processing unit having a function as the communication unit that receives the information stored in the storage unit P2 and transmits the information to the processing unit P1, and a function as the recognition unit for recognizing the connection to the optical unit 20 or the imaging apparatus 1. The configuration of the optical unit 20 can be simplified by providing such a function to the processing unit in the optical apparatus 2. Further, a processing unit having a function as the storage unit storing the unique information of the optical apparatus 2 therein may be employed as the processing unit. In the case where the optical apparatus 2 includes the processing unit, an electric power source may be provided to the optical apparatus 2. However, in the case where the imaging apparatus 1 and the optical apparatus 2 are configured integrally as described above, the processing unit and the electric power source do not have to be provided to the optical apparatus 2.

The processing unit P1 also has a function as an image processing unit (a processor), and processes the image information output from the image sensor 11 according to the received unique information. In this case, desirably, the information about the lens array 21 (for example, the number and the layout of the lens units) and the information about the filter array 22 (for example, the light transmission characteristics and the layout of the filters) in the optical unit 20, and the unique information are associated with each other and recorded in the processing unit P1 or an external apparatus as a data table in advance. Due to this preparation, the processing unit P1 can recognize how the mounted optical unit 20 is configured (what kind of characteristic the mounted optical unit 20 has) by comparing the received unique information with the data table.

The imaging system 100 may be configured in such a manner that the information about the lens array 21 and the filter array 22 like the above-described example itself is stored in the storage unit P2 as the unique information in advance and the processing unit P1 acquires the information from the storage unit P2 as necessary. Nevertheless, to simplify and miniaturize the optical unit 20, desirably, the information stored in the storage unit P2 in advance is the required minimum information such as the identification number for distinguishing the type and the individual of the optical unit 20 as described above.

For example, in the case where the filter array 22 is formed by bandpass filters, the processing unit P1 appropriately divides and rearranges one piece of image information output from the image sensor 11 based on the information about the lens array 21 and the filter array 22. As a result, the imaging system 100 can form the plurality of pieces of image information (multispectral images) corresponding to the wavelength bands supported by the bandpass filters for each of them. At this time, one multispectral image may be formed by superimposing (re-combining) the plurality of pieces of image information as necessary.

The imaging system 100 may be configured in such a manner that image processing like the above-described example is performed by an external apparatus instead of the processing unit P1 by transmitting the image information output from the image sensor 11 to the external apparatus. In this case, desirably, the image information is transmitted to the external apparatus after the information stored in the storage unit P2 is added thereto to clearly indicate the corresponding relationship between the information about the optical unit 20 and the image information. Alternatively, the storage unit P2 may be provided outside the imaging apparatus 1 as the external apparatus.

In this manner, according to the imaging system 100 described in the present exemplary embodiment, the plurality of pieces of image information to acquire simultaneously can be easily changed by configuring the optical unit 20 to be detachably attachable to the imaging apparatus 1 while integrally holding the lens array 21 and the filter array 22 as the optical unit 20.

In the following description, an imaging system 200 according to a second exemplary embodiment of the present invention will be described. The imaging system 200 according to the present exemplary embodiment will be described, omitting the descriptions of similar configurations to the imaging system 100 according to the above-described first exemplary embodiment.

Figure 3:
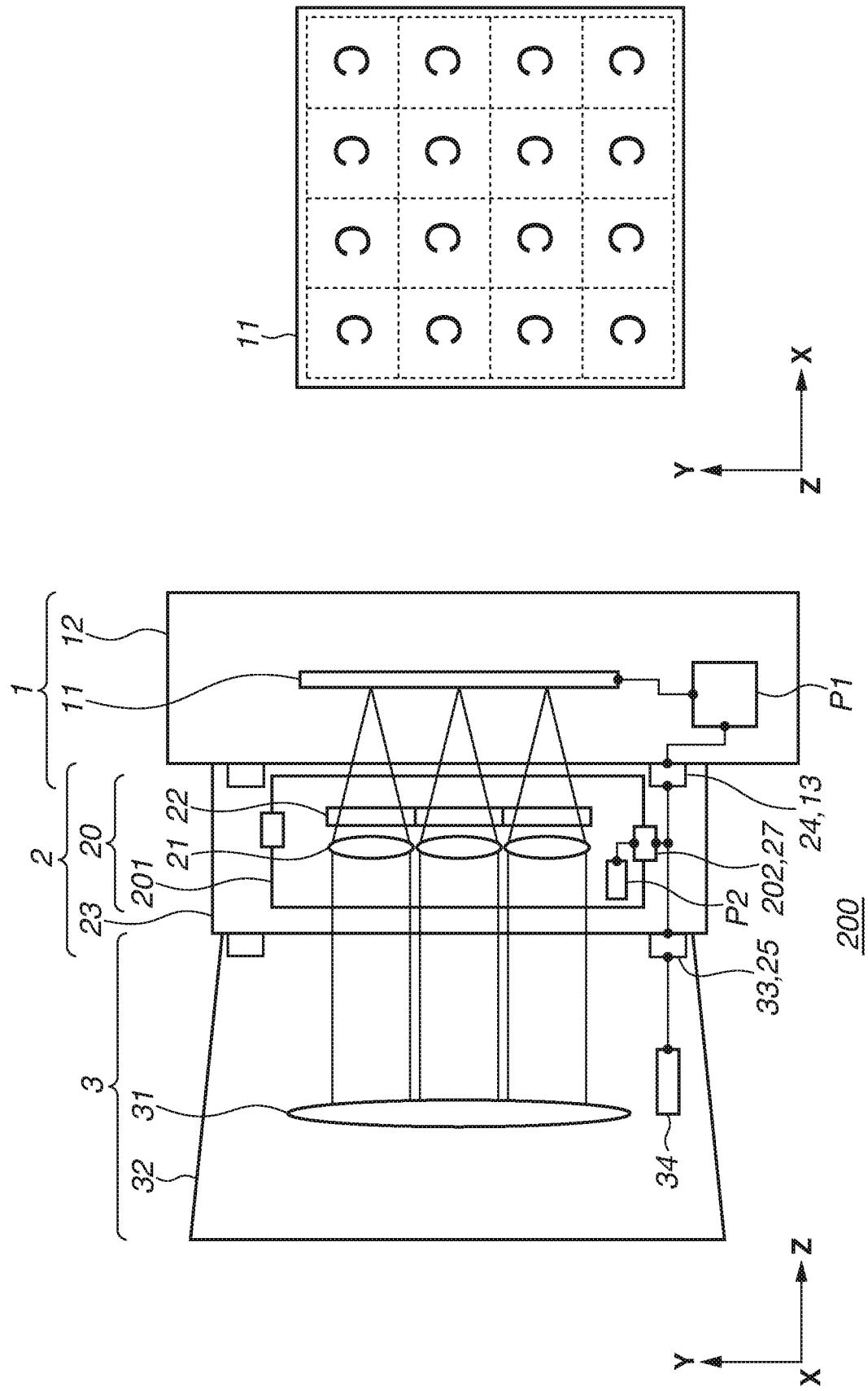
FIG. 3 illustrates an outline of main portions of an imaging system according to a second exemplary embodiment.

FIG. 3 illustrates an outline (a schematic view) of main portions of the imaging system 200 according to the present exemplary embodiment. FIG. 3 illustrates a cross section (a Y-Z cross section) containing optical axes of a part of a plurality of lens units, and a front view when the imaging plane is viewed from the −Z direction. The imaging system 200 is different from the imaging system 100 in terms of the configurations of the lens array 21 and the filter array 22 in the optical unit 20 and a lens apparatus (the lens unit) 3 mounted on the object side of the optical apparatus 2.

In the optical unit 20 according to the present exemplary embodiment, the lens array 21 includes 16 lens units, and the filter array 22 includes 16 filters corresponding to the respective lens units. In other words, the optical unit 20 includes 16 image forming units, and 16 images are formed on the imaging plane of the image sensor 11 by the respective image forming units. The number of image forming units and the layout thereof are different between the first exemplary embodiment and the second exemplary embodiment in this manner, but excellent image information can be acquired without changing the configuration of the imaging apparatus 1 by using the image sensor 11 common among the individual image forming units.

The lens apparatus 3 includes an optical system (a primary optical system) 31 including one or more lenses, which is common among the individual image forming units in the optical unit 20, and a holding member (a lens barrel portion) 32 holding the optical system 31. Further, the holding member 32 includes a mount portion 33 for being coupled with the second mount portion 25 of the optical apparatus 2. This configuration allows the lens apparatus 3 to be detachably attached to the optical apparatus 2 via the mount portion 33. However, the lens apparatus 3 is not limited to this configuration as long as the relative positions of the lens array 21 and the filter array 22, and the optical system 31 can be determined. For example, the imaging system 200 may be configured in such a manner that an opening (a hole portion) is provided at the holding member 23 of the optical apparatus 2 and the lens apparatus 3 can be directly mounted on the imaging apparatus 1 via this opening.

However, desirably, the first mount portion 24 of the optical apparatus 2 and the mount portion 33 of the lens apparatus 3 are identically shaped, and the mount portion 13 of the imaging apparatus 1 and the second mount portion 25 of the optical apparatus 2 are identically shaped. In other words, desirably, the lens apparatus 3, which is detachably attachable to the imaging apparatus 1, is configured to be also detachably attachable to the optical apparatus 2. Due to this configuration, it becomes possible to construct an imaging system that can acquire the plurality of pieces of image information simultaneously by imaging the object once using the imaging apparatus 1 as a generally used camera and the lens apparatus 3 as a generally used interchangeable lens.

The lens apparatus 3 according to the present exemplary embodiment fulfills the role of converting the angle of view (the angle of view of imaging) of the imaging system 200.

This means that the image information corresponding to various angles of view can be acquired by replacing the lens apparatus 3 with another apparatus in which the optical system 31 is differently configured. The angle of view of the imaging system 200 can also be changed by forming each of the lens units by a plurality of lens groups without using the lens apparatus 3 and making the interval between adjacent lens groups changeable. However, this case leads to an increase in the difficulty in manufacturing and controlling the lens array 21, and also undesirably results in the complication and the size increase of the configuration of the optical unit 20.

Therefore, to simplify and miniaturize the optical unit 20, desirably, the imaging system 200 is configured to be able to change the angle of view of the imaging system 200 by the replacement of the lens apparatus 3 like the present exemplary embodiment. The imaging system 200 may be configured to carry out the focus adjustment (focusing) by employing a movable lens as at least one of the lenses forming the optical system 31 in the lens apparatus 3. Further, the imaging system 200 may be configured to be able to adjust the angle of view and the image forming magnification by forming the optical system 31 by a plurality of lens groups and changing the interval between adjacent lens groups to change the focal length of the imaging system 200.

When the focal position of each of the lens units in the lens array 21 and the imaging plane of the image sensor 11 coincide with each other, the light emitted from the object positioned at infinity and input to the lens array 21 is parallel light. Therefore, desirably, the optical system 31 in the lens apparatus 3 is constructed as a collimator optical system, and the optical system 31 is configured to guide the parallel light to the lens array 21. According to this configuration, a change in the image forming performance can be prevented when the lens apparatus 3 is displaced in the direction perpendicular to the optical axis due to the mounting error in each of the mount portions.

However, when the lens apparatus 3 is demounted in this configuration, i.e., when the image is captured with only the optical apparatus 2 mounted on the imaging apparatus 1 like the first exemplary embodiment, the object positioned at a short distance is out of focus and is undesirably blurred in the captured image. Therefore, in this configuration, desirably, the imaging system 200 is configured to be able to be focused by being provided with a mechanism for changing the relative positions of the lens array 21 and the image sensor 11 as described above.

Further, desirably, the lens apparatus 3 includes a processing unit P3 similar to the storage unit P2 in the optical unit 20. The processing unit P3 stores unique information regarding the lens apparatus 3 therein, and can transmit the unique information to the processing unit P1 in the imaging apparatus 1 via the storage unit P2 in the optical unit 20 or directly. The processing unit P1 can recognize the type and the individual of the lens apparatus 3 based on the unique information of the lens apparatus 3. Further, the processing unit P1 can process the image information output from the image sensor 11 according to at least one of the unique information of the lens apparatus 3 and the unique information of the optical unit 20.

In the following description, an imaging system 300 according to a third exemplary embodiment of the present invention will be described. The imaging system 300 according to the present exemplary embodiment will be described, omitting the descriptions of similar configurations to the imaging system 200 according to the above-described second exemplary embodiment.

Figure 4:
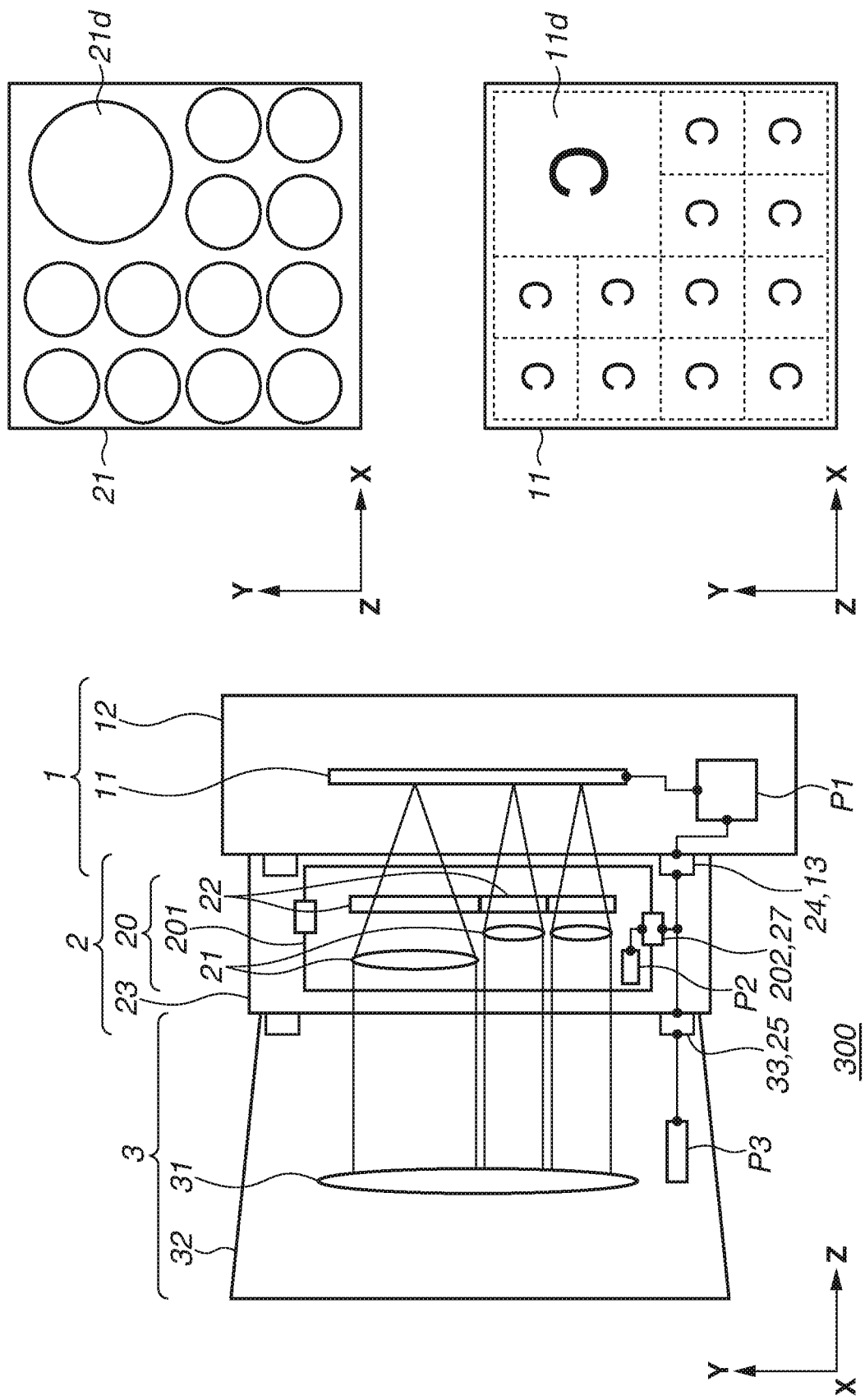
FIG. 4 illustrates an outline of main portions of an imaging system according to a third exemplary embodiment.

FIG. 4 illustrates an outline (a schematic view) of main portions of the imaging system 300 according to the present exemplary embodiment. FIG. 4 illustrates a cross section (a Y-Z cross section) containing optical axes of a part of a plurality of lens units, a front view of the lens array 21, and a front view of the imaging plane. The imaging system 300 is different from the imaging system 200 in terms of the number of lens units forming the lens array 21, and the size and the layout of a part of the lens units.

In the optical unit 20 according to the present exemplary embodiment, the lens array 21 includes 13 lens units, and the filter array 22 includes 13 filters corresponding to the lens units, respectively. In other words, the optical unit 20 includes 13 image forming units, and 13 images are formed on the imaging plane of the image sensor 11 by the respective image forming units. Then, as illustrated in FIG. 4, the size of a lens unit 21d in the lens array 21 according to the present exemplary embodiment is larger than the other lens units. More specifically, the lens unit 21d according to the present exemplary embodiment is disposed so as to occupy the region where the four lens units are disposed in the lens array 21 according to the second exemplary embodiment.

In the present exemplary embodiment, each of the lens units also serves a role as an aperture stop, and the brightness (the F-number) of each of the image forming units is determined based on the size (the effective diameter) of each of the lens units. Therefore, the light amount of the image formed by the lens unit 21d is greater than the light amounts of the images formed by the other lens units. Changing the size of a part of the lens units in the lens array 21 in this manner allows the imaging system 300 to acquire imaging information including a plurality of different pieces of light amount information by imaging the object once. Another lens unit having a differently-sized effective diameter may also be provided besides the lens unit 21d.

Further, in the present exemplary embodiment, the focal length of the lens unit 21d is increased compared to the other lens units and the lens unit 21d is also disposed closer to the object side than the other lens units are as illustrated in FIG. 4 according to the increase in the size of the lens unit 21d compared to the other lens units. Therefore, an image 11d formed by the lens unit 21d is enlarged compared to the images formed by the other lens units as illustrated in FIG. 4. Therefore, if the image sensor 11 has a constant pixel density, the resolution of the image 11d is increased compared to the resolutions of the other images. Therefore, according to this configuration, the imaging system 300 can acquire imaging information at a plurality of different resolutions by imaging the object once.

For example, in a case where the filter array 22 is formed by a plurality of bandpass filters corresponding to band widths different from each other, a sufficient resolution can be secured by disposing a bandpass filter corresponding to a long wavelength band for which an aberration correction is relatively difficult on the optical axis of the lens unit 21d. Alternatively, the lens unit 21d may be exclusively used to acquire luminance information (a luminance distribution) with no filter disposed on the optical axis of the lens unit 21d. In this case, the luminance information acquired from the image 11d can be used to, for example, correct the dynamic range of the image information acquired from another image and perform super-resolution processing using sub-pixel information based thereon.

In the following description, an imaging system 400 according to a fourth exemplary embodiment of the present invention will be described. The imaging system 400 according to the present exemplary embodiment will be described, omitting the descriptions of similar configurations to the imaging system according to each of the above-described exemplary embodiments.

Figure 5:
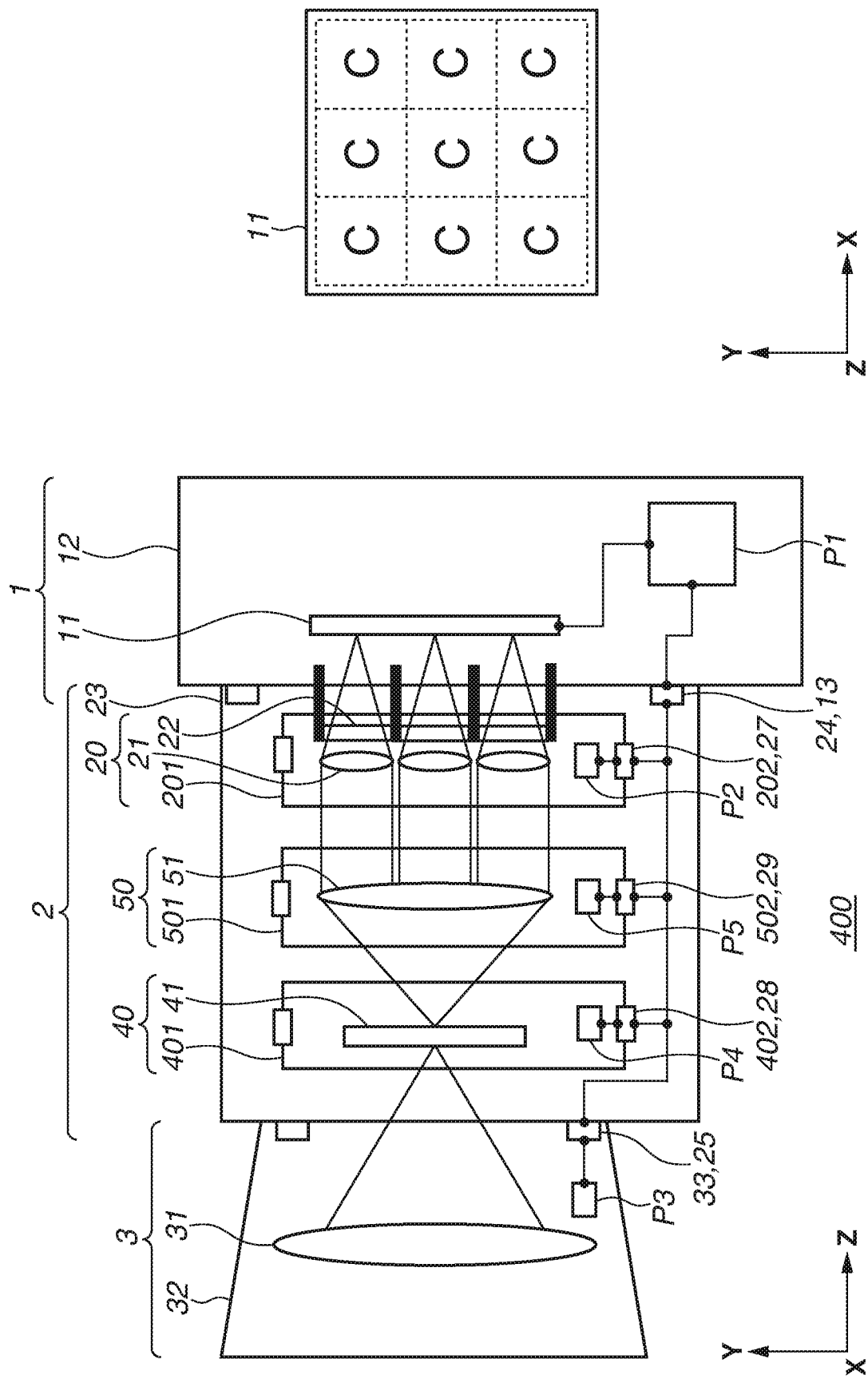
FIG. 5 illustrates an outline of main portions of an imaging system according to a fourth exemplary embodiment.

FIG. 5 illustrates an outline (a schematic view) of main portions of the imaging system 400 according to the present exemplary embodiment. FIG. 5 illustrates a cross section (a Y-Z cross section) containing optical axes of a part of a plurality of lens units, and a front view of the imaging plane. The imaging system 400 is different from the imaging system 100 in that the lens apparatus 3 is mounted on the object side of the optical apparatus 2 and optical units 40 and 50 are also mounted inside the optical apparatus 2.

The lens apparatus 3 according to the present exemplary embodiment includes the optical system 31 including one or more lenses and the holding member 32 holding the optical system 31 similarly to the lens apparatus 3 according to the second and third exemplary embodiments. However, the optical system 31 according to the present exemplary embodiment forms an intermediate image of the object by collecting the light from the object, unlike the optical system 31 according to the second and third exemplary embodiments.

The optical unit (a second optical unit or a diffusion unit) 40 according to the present exemplary embodiment includes a diffusion element 41 that diffuses the light, and a holding member 401 holding the diffusion element 41. Further, the optical unit (a third optical unit or a collimator unit) 50 according to the present exemplary embodiment includes an optical system 51 including one or more lenses, and a holding member 501 holding the optical system 51. The diffusion element 41 is disposed at the position of an intermediate image plane (a primary image forming plane) formed by the lens apparatus 3, and serves a role as a screen. A diffusion member (a diffusion plate) having a diffusion surface (a rough surface), a microlens array formed by a plurality of microlenses, or the like can be employed as the diffusion element 41. The optical system 51 has a function as a collimator optical system that collimates the light from the diffusion element 41 into parallel light.

Then, the holding member 401 includes a coupling portion 402 for being coupled with a coupling portion (a second coupling portion) 28 provided to the holding member 23, and the holding member 501 includes a coupling portion 502 for being coupled with a coupling portion (a third coupling portion) 29 provided to the holding member 23. In other words, the imaging system 400 according to the present exemplary embodiment is configured to allow each of the optical units 20, 40, and 50 to be detachably attached to the holding member 23 via the respective coupling portions. This configuration allows each of the optical units 20, 40, and 50 to be individually replaced, thereby allowing the optical performance of the optical apparatus 2 to be flexibly changed according to the image information desired to acquire and the conditions of the subject.

The imaging system 400 according to the present exemplary embodiment is configured to cause the parallel light to be incident on the optical unit 20 similarly to the imaging systems 200 and 300 according to the second and third embodiments by using the optical unit 50. This configuration allows the optical apparatus 2 according to the present exemplary embodiment to be applied even to a lens apparatus that does not form the intermediate image of the object like the example indicated in the second and third exemplary embodiments. Therefore, desirably, the shape of the mount portion of each of the apparatuses is identically shaped regardless of the configuration of each of the optical systems to ensure the compatibility of the optical apparatus 2 and the lens apparatus 3.

In a case where a lens apparatus that forms the intermediate image of the object is used like the lens apparatus 3 according to the present exemplary embodiment, desirably, a field stop is disposed at the position of the intermediate image plane. This configuration makes it possible to appropriately set the shape and the size of the boundary of each of the images formed on the imaging plane of the image sensor 11. For example, in a case where the light from each of the image forming units interferes with each other on the imaging plane, this situation can be improved by reducing the size of an aperture (the aperture diameter) provided at the field stop. In this case, to improve the use efficiency of the image sensor 11, desirably, the aperture of the field stop is, for example, rectangularly shaped, which allows the imaging plane to be evenly divided.

Further, because the boundary of each of the images on the imaging plane becomes clearer as the field stop is disposed closer to the position of the intermediate image plane, desirably, the field stop is disposed in close contact with the diffusion element 41 in the case where the diffusion element 41 is disposed at the position of the intermediate image plane like the present exemplary embodiment. In other words, desirably, the optical unit 40 is configured to include the field stop. In this case, in a case where the diffusion element 41 has some thickness, more desirably, the field stop is disposed on the image side of the diffusion element 41 to reduce the influence of the scattering inside the diffusion element 41. In the present exemplary embodiment, the diffusion element 41 can be equipped with a function as the field stop by providing a light-shielding member (a light-shielding coating material) on the diffusion element 41 except for the central portion (a rectangular portion) thereof as illustrated in FIG. 5. Alternatively, the field stop and the diffusion element 41 may be integrally configured by disposing the diffusion element 41 at an aperture portion provided at a light-shielding member forming the field stop.

When the diffusion element 41 is disposed at the position of the intermediate image plane, the light from the lens apparatus 3 is diffused by the diffusion element 41, and therefore the information regarding the incident angle of the light from the lens apparatus 3 is removed and parallax can be prevented from occurring among the respective images. However, in a case where the imaging system 400 according to the present exemplary embodiment is used as a distance measurement apparatus like the example that will be described below, information regarding the distance to the object is acquired using the parallax among the respective images, and therefore the information regarding the incident angle of the light from the lens apparatus 3 should be preserved. In this case, a similar function to the present exemplary embodiment can be realized while the information regarding the incident angle is preserved, by disposing a positive lens as a field lens instead of the diffusion element 41 immediately in front of the field stop.

As illustrated in FIG. 5, desirably, the optical units 40 and 50 include storage units P4 and P5 similar to the storage unit P2 in the optical unit 20. In this case, desirably, unique information regarding the optical unit 40 is stored in the storage unit P4, and unique information regarding the optical unit 50 is stored in the storage unit P5. Due to this storage, each of the pieces of unique information can be transmitted to the processing unit P1 in the imaging apparatus 1 via each of the coupling portions or directly. The processing unit P1 can recognize the types and the individuals of the lens apparatus 3 and the optical units 20, 40, and 50 based on the respective pieces of unique information. Further, the processing unit P1 can process the image information output from the image sensor 11 according to the unique information of at least one of the lens apparatus 3 and the optical units 20, 40, and 50. At this time, the influence of an aberration occurring on the lens apparatus 3 on the image information may be corrected using the unique information of the lens apparatus 3.

Now, the imaging system 400 according to the present exemplary embodiment is configured to image the object again by the optical unit 20 after the object is imaged by the lens apparatus 3, and therefore an erect image is formed on the imaging plane according to the present exemplary embodiment as illustrated in FIG. 5. Therefore, information for determining whether the image formed on the imaging plane is an inverted image or an erect image becomes necessary to appropriately process the image information by the processing unit P1 in the imaging apparatus 1.

Therefore, desirably, information for identifying whether the image is inserted or not is stored in at least one of the storage units P4 and P5 in advance. For example, this storage can be achieved by storing information for identifying that the image of the object is formed once (inverted) in at least one of the storage units P4 and P5 in advance if the lens apparatus mounted on the optical apparatus 2 is assumed to be only a lens apparatus that forms the intermediate image of the object. If ever the imaging system 400 is configured in such a manner that each of the image forming units in the optical unit 20 images the object a plurality of times, the intended purpose can be fulfilled by also storing information regarding the inversion of the image in the storage unit P2 in advance.

In the following description, an imaging system 500 according to a fifth exemplary embodiment of the present invention will be described. The imaging system 500 according to the present exemplary embodiment will be described, omitting the descriptions of similar configurations to the imaging system 100 according to the above-described first exemplary embodiment.

Figure 6:
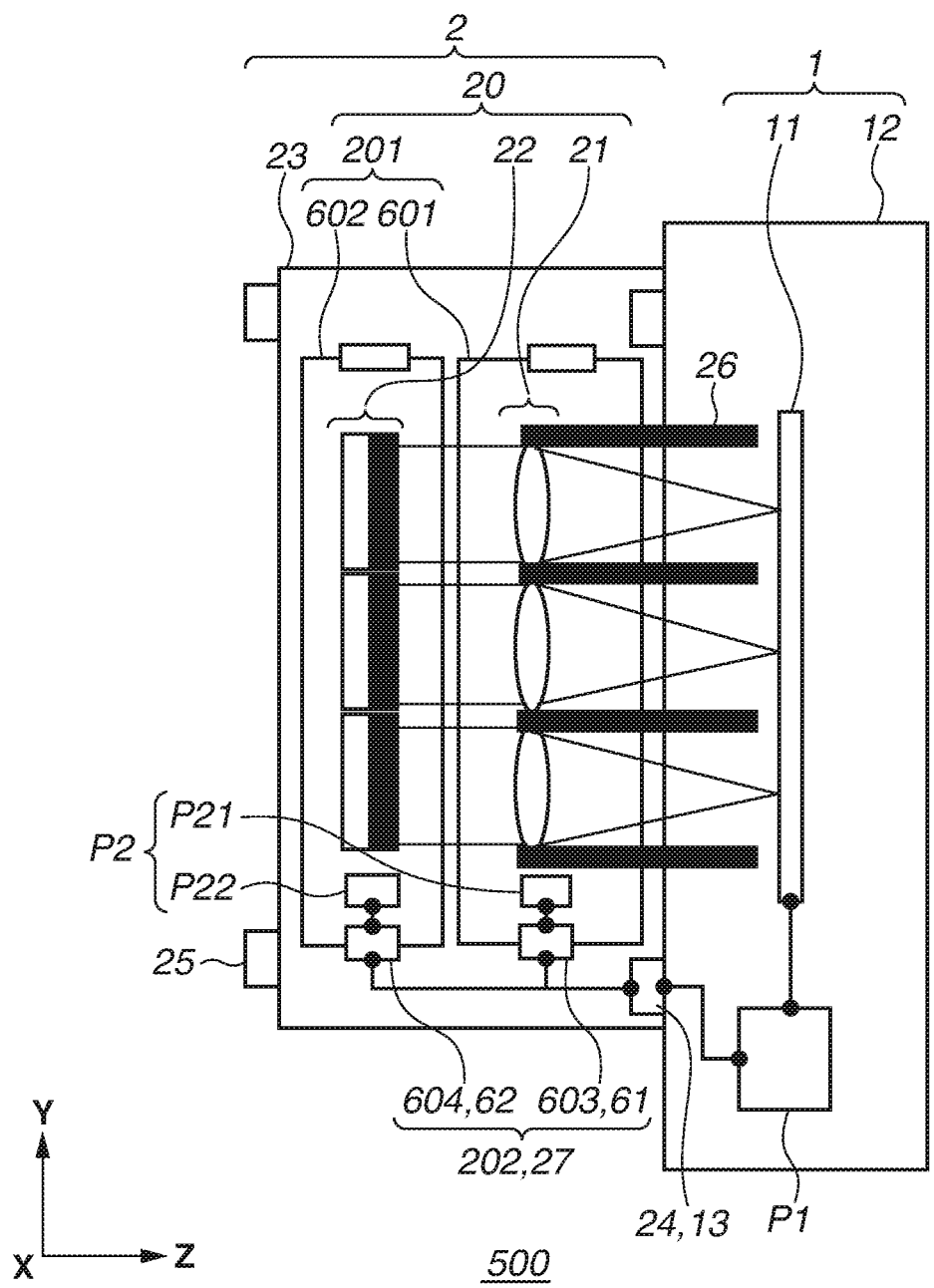
FIG. 6 illustrates an outline of main portions of an imaging system according to a fifth exemplary embodiment.

FIG. 6 illustrate an outline (a schematic view) of main portions of the imaging system 500 according to the present exemplary embodiment. FIG. 6 illustrates a cross section containing optical axes of a part of a plurality of lens units. The imaging system 500 is different from the imaging system 100 in that the holding members 201 holding the lens array 21 and the filter array 22 are individually independent.

The holding member 201 according to the present exemplary embodiment includes a first holding member 601 holding the lens array 21, and a second holding member 602 holding the filter array 22. The first holding member 601 is provided with a coupling portion (a detachable attachment portion) 603 for being coupled with a coupling portion 61, which is a part of the coupling portion 27, and the second holding member 602 is provided with a coupling portion (a detachable attachment portion) 604 for being coupled with a coupling portion 62, which is a part of the coupling portion 27. In other words, the coupling portion 202 provided to the holding member 201 includes the plurality of coupling portions 603 and 604. The imaging system 500 is configured to hold the lens array 21 and the lens array 22 by the holding members independent of each other in this manner, thereby allowing the lens array 21 and the filter array 22 to be detachably attached to the holding member (the lens barrel portion) 23 independently of each other. As a result, the imaging system 500 can increase choices for the combination of the lens array 21 and the filter array 22.

In the configuration in which the lens array 21 and the filter array 22 are replaceable individually, the respective relative positions may be misaligned as described in the first exemplary embodiment. Therefore, desirably, the coupling portions 61 and 62, with which the first holding member 601 and the second holding member 602 are coupled, are provided on a single member (a rigid member). For example, the relative position misalignment can be reduced by making the holding member 23 from a single member (a rigid member) and positioning the first holding member 601 and the second holding member 602 by abutting them against it. Which configuration should be employed, the first exemplary embodiment or the present exemplary embodiment, can be arbitrarily selected according to the required optical performance and the like.

As illustrated in FIG. 6, desirably, the first holding member 601 and the second holding member 602 include storage units P21 and P22 as a part of the above-described storage unit P2, respectively. In this case, desirably, the unique information regarding the lens array 21 is stored in the storage unit P21, and the unique information regarding the filter array 22 is stored in the storage unit P22. Due to this storage, each of the pieces of unique information can be transmitted to the processing unit P1 in the imaging apparatus 1 via each of the coupling portions or directly. The processing unit P1 can recognize the types and the individuals of the lens array 21 and the filter array 22 based on the respective pieces of unique information. Further, the processing unit P1 can process the image information output from the image sensor 11 according to the unique information of at least one of the lens array 21 and the filter array 22.

In the present exemplary embodiment, the imaging system 500 is configured in such a manner that the lens array 21 is disposed closer to the image side than the filter array 22 is, unlike the first exemplary embodiment. This layout facilitates restricting the incident angle of the light on the filter array 22 compared to when the lens array 21 is disposed closer to the object side than the filter array 22 is. Therefore, such a layout is desirably employed when the incident angle of the light on the filter array 22 is desired to be restricted in consideration of the angular characteristic of the filter array 22. However, when the angular characteristic of the filter array 22 does not have to be taken into consideration, the positional relationship between the lens array 21 and the filter array 22 is not especially limited.

Further, in the present exemplary embodiment, the filter array 22 includes a plurality of optical elements arranged in the optical-axis direction, unlike the first exemplary embodiment. More specifically, the filter array 22 includes a bandpass filter (a wavelength selection element) disposed on the object side and a diffractive element disposed on the image side on each of the optical axes. An on-axis chromatic aberration occurs on a generally used lens due to a difference in focal distance for each wavelength of the incident light. Therefore, if the filter array 22 includes only the bandpass filter, the imaging system may be defocused and undesirably have a great on-axis chromatic aberration therein when the filter array 22 is replaced.

Therefore, desirably, the imaging system is configured to use each diffractive element to correct the defocus when the filter array 22 is replaced, by disposing a different diffractive element for each of the respective transmission wavelength bands of the bandpass filters like the present exemplary embodiment. The bandpass filter and the diffractive element may be bonded to each other. Further, any one of the bandpass filter and the diffractive element may be equipped with the functions of both of them by adding the function of the other thereto using film formation, surface processing, or the like.

Distance Measurement Apparatus

The imaging system according to each of the above-described exemplary embodiments can be used as a distance measurement apparatus such as an in-vehicle camera or a monitoring camera, and this application will be described in the following description.

The respective optical axes of the lens units forming the lens array 21 in the optical unit 20 are spaced apart from each other in at least one of the X direction and the Y direction, and therefore parallax is generated among the images respectively formed by the lens units. Therefore, the information regarding the distance to the object (the distance information) can be acquired by the processing unit P1 in the imaging apparatus 1 or an external apparatus based on the information regarding the parallax (the parallax information). The distance information here refers to information regarding the relative position for the object, such as an interval to the object, a defocus amount, and an image displacement amount, and may be any of information directly indicating a distance value of the object in the image information and information indirectly indicating information corresponding to the distance value.

For example, any two filters in the filter array 22 illustrated in FIG. 1 are used as bandpass filters corresponding to the same transmission wavelength range as each other, by which a pair of image forming units including these bandpass filters functions as a stereo optical system (a distance measurement optical system). This means that the imaging system 100 illustrated in FIG. 1 functions as the stereo camera (the distance measurement apparatus). Therefore, the distance information of the object can be acquired based on the parallax information of stereo images formed by this pair of image forming units.

The pair of image forming units used as the stereo optical system may be any of image forming units arranged in the horizontal direction (the X direction), image forming units arranged in the vertical direction (the Y direction), and image forming units arranged in the diagonal direction. Nevertheless, because the accuracy of the distance measurement improves as the parallax between the stereo images increases, desirably, the pair of image forming units spaced most apart from each other among the plurality of image forming units is used as the stereo optical system. Further, not only one pair of image forming units but also another pair of image forming units may be used for the distance measurement. When a plurality of objects placed in the depth direction (the Z direction) is targeted for the distance measurement, an issue called occlusion occurs from the insufficiency of the information about the object located behind the front object, and, therefore, more desirably, three or more image forming units are used for the distance measurement as a set.

Exemplary Modifications

Having described representative exemplary embodiments and examples of the present invention, the present invention is not limited to these exemplary embodiments and examples, and these exemplary embodiments and examples can be combined, modified, and changed in various manners within the range of the spirit of the present invention.

For example, the imaging system may be configured in such a manner that the optical unit 20 includes an optical element other than the lens array 21 and the filter array 22, or the optical apparatus 2 includes an optical element disposed on the image side of the optical unit 20. Further, each of the coupling portions according to each of the above-described exemplary embodiments is not limited to a coupling portion having a special structure for the coupling. For example, even when a structure for the coupling is provided to only any one of the holding member 23 and the optical unit in the optical apparatus 2 and nothing is provided to the other, the portion where they are coupled with each other can be referred to as the coupling portion.

Each of the above-described exemplary embodiments has been described assuming that the lens unit also serves the role as the aperture stop, i.e., the effective diameter of the lens unit is determined based on the lens unit itself, but the aperture stop may be provided as a different member. Further, in the case where the lens unit includes a plurality of lenses or the filter includes a plurality of filter elements in one image forming unit, the lenses and the filter elements may be alternately arranged in the optical-axis direction. Similarly to the fifth exemplary embodiment, the diffractive element may also be employed as the filter element in the other exemplary embodiments.

Further, an image forming unit including a plurality of filters arranged so as to divide the pupil of the lens unit in X-Y cross section may be employed. In this case, the imaging system can be used as a plenoptic camera by providing a microlens array in a region corresponding to this image forming unit on the imaging plane. According to this configuration, the light passing through the pupil of one lens unit is divided and incident on pixels different from each other on the imaging plane, which allows the imaging system to acquire even more pieces of image information.

The optical apparatus 2 and the lens apparatus 3 are configured to be detachably attachable to each other in the above-described second and third exemplary embodiments, but may be integrated with each other as necessary, thereby preventing the occurrence of an error in the mounting on each other. For example, the optical apparatus 2 and the lens apparatus 3 may be prepared as one lens apparatus (accessory apparatus) detachably attachable to the imaging apparatus 1 by being configured integrally.

The optical units 20, 40, and 50 are each configured to be individually detachably attachable to the holding member 23 in the fourth exemplary embodiment, but any two or all of them may be integrated as necessary, thereby preventing the occurrence of an error in the mounting on each other. Further, in the fourth exemplary embodiment, instead of all the optical units 20, 40, and 50 configured to be detachably attachable to the holding member 23, a part of the optical units 20, 40, and 50 may be configured integrally with the holding member 23. For example, in a case where the optical system 51 has a relatively large aperture diameter and is configured compatibly with various optical units 20, the optical unit 50 does not have to be frequently replaced, and therefore is desirably fixed to the holding member 23 to ensure the positional accuracy.

Figure 7:
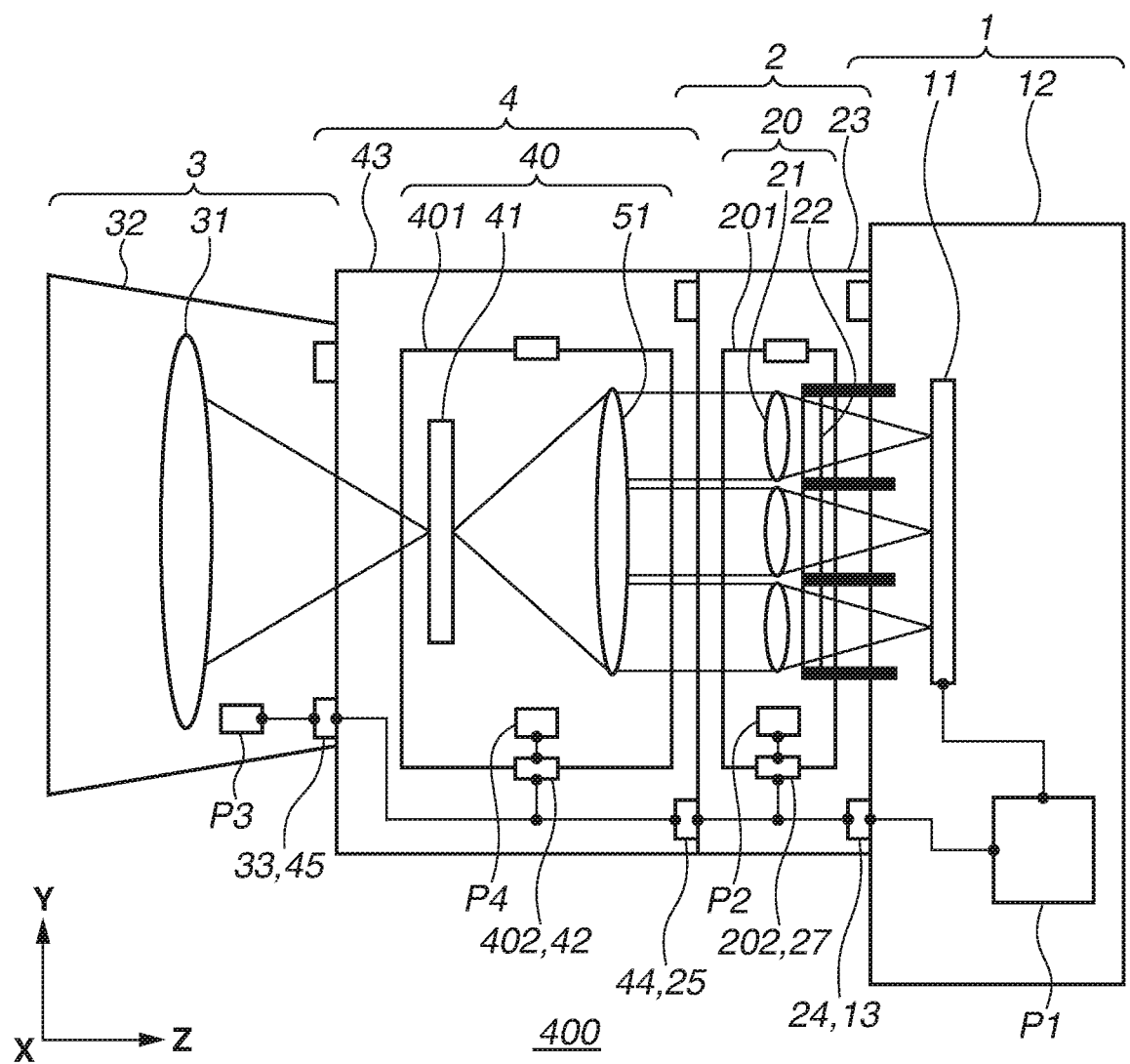
FIG. 7 illustrates an outline of main portions of an imaging system according to an exemplary modification of the fourth exemplary embodiment.

Further, in the fourth exemplary embodiment, the optical units 40 and 50 may be configured as adapter apparatuses (accessory apparatuses) different from the optical apparatus 2 as necessary. For example, as illustrated in FIG. 7, the imaging system 400 may employ an adapter apparatus 4, which includes the optical unit 40 with the diffusion element 41 and the optical system 51 held by a common holding member 401 therein, and a holding member (a lens barrel portion) 43 provided with a coupling portion 42 capable of being coupled with a coupling portion 402 of the holding member 401. The optical units 40 and 50 are integrated in FIG. 7, but may be configured as different members similarly to the fourth exemplary embodiment. Further, the holding member 401 and the holding member 43 may be configured integrally as necessary.

The holding member 43 in the adapter apparatus 4 includes a mount portion 44 for being coupled with the second mount portion 25 of the optical apparatus 2, and a mount portion 45 for being coupled with the mount portion 33 of the lens apparatus 3. This configuration allows the adapter apparatus 4 to be detachably attached to the optical apparatus 2 and the lens apparatus 3 via the respective mount portions. In this case, even when the lens apparatus 3 cannot be directly detachably attached to the imaging apparatus 1 and the optical apparatus 2, the intermediation of the adapter apparatus 4 allows the lens apparatus 3 to be indirectly detachably attached thereto.

However, desirably, the first mount portion 24 of the optical apparatus 2 and the mount portion 33 of the lens apparatus 3 are identically shaped, and the mount portion 13 of the imaging apparatus 1 and the fourth mount portion 45 of the adapter apparatus 4 are identically shaped. In other words, desirably, the lens apparatus 3, which is detachably attachable to the imaging apparatus 1, is configured to be also detachably attachable to the adapter apparatus 4. Due to this configuration, it becomes possible to construct an imaging system that can acquire the plurality of pieces of image information simultaneously by imaging the object once using the imaging apparatus 1 as a generally used camera and the lens apparatus 3 as a generally used interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-147444, filed Aug. 9, 2019, and No. 2020-090593, filed May 25, 2020, which are hereby incorporated by reference herein in their entirety.

What is claimed is:

1. An optical unit detachably mountable to a single lens barrel portion disposed closer to an object than an image sensor included in an imaging apparatus, the optical unit comprising:
    a plurality of lens units each configured to form an image of the object;
    a plurality of filters disposed on optical axes of the plurality of lens units; and
    a common holding member configured to hold the plurality of lens units and the plurality of filters,
    wherein the plurality of lens units and the plurality of filters are placed inside the single lens barrel portion when the optical unit is mounted to the single lens barrel portion,
    wherein the plurality of filters includes a first filter and a second filter having light transmission characteristics different from each other, and
    wherein the holding member includes a coupling portion capable of being coupled with the single lens barrel portion.

2. The optical unit according to claim 1, wherein the coupling portion includes an electric contact for electrically connecting to the single lens barrel portion.

3. The optical unit according to claim 1, further comprising a storage configured to store information regarding the plurality of lens units and the plurality of filters.

4. The optical unit according to claim 1, wherein the coupling portion is disposed outside the plurality of lens units and the plurality of filters in a direction perpendicular to the optical axes.

5. An optical apparatus comprising:
    the single lens barrel portion with which the coupling portion of the optical unit according to claim 1 can be coupled.

6. The optical apparatus according to claim 5, wherein the single lens barrel portion includes a first mount portion capable of being coupled with the imaging apparatus.

7. The optical apparatus according to claim 6, wherein the first mount portion includes an electric contact for electrically connecting to the imaging apparatus.

8. The optical apparatus according to claim 5, further comprising a communicator configured to transmit information regarding the plurality of lens units and the plurality of filters to the imaging apparatus.

9. The optical apparatus according to claim 5, further comprising an optical system configured to guide light transmitted from the object to the optical unit, the optical system being used in common among the plurality of lens units.

10. The optical apparatus according to claim 9, wherein the optical system collimates the light transmitted from the object into parallel light.

11. The optical apparatus according to claim 5, further comprising a second mount portion capable of being coupled with an accessory apparatus.

12. The optical apparatus according to claim 11, wherein the second mount portion includes an electric contact for electrically connecting to the accessory apparatus.

13. The optical apparatus according to claim 11, wherein the accessory apparatus is detachably attachable to the imaging apparatus.

14. An imaging system comprising:
    the optical apparatus according to claim 6; and
    the imaging apparatus on which the optical apparatus is mounted.

15. The imaging system according to claim 14, further comprising an accessory apparatus mounted on the optical apparatus.

16. An imaging apparatus comprising:
    the single lens barrel portion with which the coupling portion of the optical unit according to claim 1 can be coupled; and
    the image sensor.

17. The imaging apparatus according to claim 16, further comprising a processor configured to receive information regarding the plurality of lens units and the plurality of filters.

18. The imaging apparatus according to claim 17, wherein the processing unit processes image information acquired by the image sensor based on the information regarding the plurality of lens units and the plurality of filters.

19. The optical unit according to claim 1,
    wherein an opening is provided on the single lens barrel portion, and
    wherein the optical unit is inserted into the single lens barrel portion via the opening from a direction perpendicular to an optical axis.

20. An optical unit detachably mountable to a single lens barrel portion disposed closer to an object than an image sensor included in an imaging apparatus, the optical unit comprising:
- a plurality of lens units each configured to form an image of the object;
- a plurality of filters disposed on optical axes of the plurality of lens units; and
- a first holding member configured to hold the plurality of lens units and a second holding member configured to hold the plurality of filters,
- wherein the plurality of lens units and the plurality of filters are placed inside the single lens barrel portion when the optical unit is mounted to the single lens barrel portion,
- wherein the plurality of filters includes a first filter and a second filter having light transmission characteristics different from each other, and
- wherein each of the first holding member and the second holding member includes a coupling portion capable of being coupled with the single lens barrel portion.

* * * * *